United States Patent
Kawai et al.

(10) Patent No.: US 10,125,554 B2
(45) Date of Patent: Nov. 13, 2018

(54) THREADED JOINT FOR OIL COUNTRY TUBULAR GOODS

(71) Applicant: JFE STEEL CORPORATION, Tokyo (JP)

(72) Inventors: Takamasa Kawai, Tokyo (JP); Kazunari Takahashi, Tokyo (JP); Hiroshi Chikatsune, Tokyo (JP); Masaki Yoshikawa, Tokyo (JP); Jun Takano, Tokyo (JP); Takuya Nagahama, Tokyo (JP); Masateru Ueta, Tokyo (JP); Hideo Sato, Tokyo (JP); Haruhiko Seki, Tokyo (JP); Tsuyoshi Yoneyama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 324 days.

(21) Appl. No.: 14/897,802

(22) PCT Filed: Jun. 9, 2014

(86) PCT No.: PCT/JP2014/003055
§ 371 (c)(1),
(2) Date: Dec. 11, 2015

(87) PCT Pub. No.: WO2014/199619
PCT Pub. Date: Dec. 18, 2014

(65) Prior Publication Data
US 2016/0130884 A1 May 12, 2016

(30) Foreign Application Priority Data

Jun. 14, 2013 (JP) .................................. 2013-125332

(51) Int. Cl.
*F16L 15/06* (2006.01)
*E21B 17/042* (2006.01)
*F16L 15/00* (2006.01)

(52) U.S. Cl.
CPC .......... *E21B 17/042* (2013.01); *F16L 15/004* (2013.01); *F16L 15/06* (2013.01)

(58) Field of Classification Search
CPC ........ F16L 15/004; F16L 15/06; F16L 15/001
(Continued)

(56) References Cited

U.S. PATENT DOCUMENTS

| 2,204,754 | A | * | 6/1940 | Frame ................... | F16L 15/004 |
| | | | | | 285/334 |
| 3,050,318 | A | * | 8/1962 | Van Der Wissel ... | F16L 15/001 |
| | | | | | 285/334 |

(Continued)

FOREIGN PATENT DOCUMENTS

| JP | 62196486 | 8/1987 |
| JP | 62196488 | 8/1987 |

(Continued)

OTHER PUBLICATIONS

Japanese Office Action/Notice of Allowance with English language translation for Application No. JP 2013-125332, 5 pages.

(Continued)

*Primary Examiner* — David Bochna
(74) *Attorney, Agent, or Firm* — RatnerPrestia

(57) ABSTRACT

In a joint for oil country tubular goods, a pitch change is made such that an internally-thread pitch has the same value as an externally-thread pitch from a thread end portion on a box end side to a pitch change position taken on a box center side with respect to a position away from the thread end portion by ½ of an entire length of the threaded portion, and the internally-thread pitch is changed to a value less than the externally-thread pitch at the pitch change position so that a thread gap is gradually decreased from the pitch change position to a position of the thread end portion on the box center side, and the thread gap is eventually set to a value which is 0.2 to 0.8 times as large as the thread gap before the pitch change is made.

1 Claim, 4 Drawing Sheets

INTERNALLY-THREAD PITCH 20B = EXTERNALLY-THREAD PITCH 20P
THREAD GAP 10 BEING FIXED AT THIS POINT

(58) Field of Classification Search
USPC .................................................. 285/333, 334
See application file for complete search history.

(56) References Cited

U.S. PATENT DOCUMENTS

| | | | | |
|---|---|---|---|---|
| 3,210,096 | A * | 10/1965 | Van Der Wissel ... | F16L 15/004 285/334 |
| 4,582,348 | A * | 4/1986 | Dearden ............... | F16L 15/004 285/334 |
| 4,629,222 | A * | 12/1986 | Dearden ............... | E21B 17/042 285/332.4 |
| 4,629,223 | A * | 12/1986 | Dearden ............... | F16L 15/004 285/334 |
| 4,688,832 | A * | 8/1987 | Ortloff ................. | F16L 15/004 285/334 |
| 5,360,239 | A * | 11/1994 | Klementich .......... | F16L 15/001 285/334 |
| 6,123,368 | A * | 9/2000 | Enderle ................ | F16L 15/002 285/334 |
| 6,155,613 | A * | 12/2000 | Quadflieg ............. | F16L 15/06 285/334 |
| 6,585,299 | B1 * | 7/2003 | Quadflieg ............. | F16L 15/004 285/219 |
| 7,452,007 | B2 * | 11/2008 | Hashem ................ | F16L 15/003 285/334 |
| 7,513,534 | B2 * | 4/2009 | Noel ..................... | F16L 15/004 285/334 |
| 8,181,998 | B2 * | 5/2012 | Watts .................... | F16L 15/004 285/334 |
| 8,925,975 | B2 * | 1/2015 | Granger ............... | E21L 317/042 285/333 |
| 2006/0006647 | A1 | 1/2006 | Hashem | |

FOREIGN PATENT DOCUMENTS

| | | |
|---|---|---|
| JP | 0243948 | 10/1990 |
| JP | 09126367 | 5/1997 |
| JP | 2001021072 | 1/2001 |

OTHER PUBLICATIONS

Extended European Search Report for European Application No. 14811719.5, dated May 17, 2016, 8 pages.

International Search Report for International Application No. PCT/JP2014/003055 dated Sep. 9, 2014.

* cited by examiner

FIG. 1A

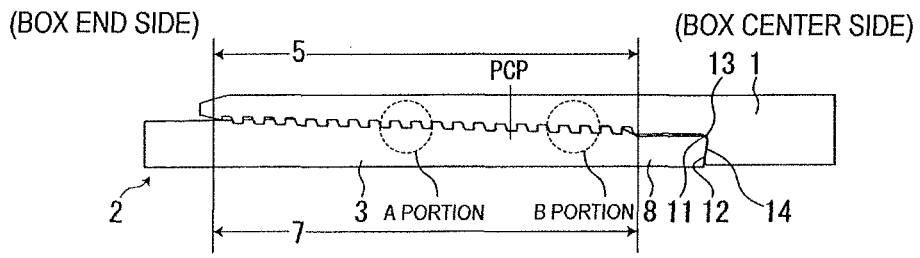

FIG. 1B

ENLARGED VIEW OF A PORTION

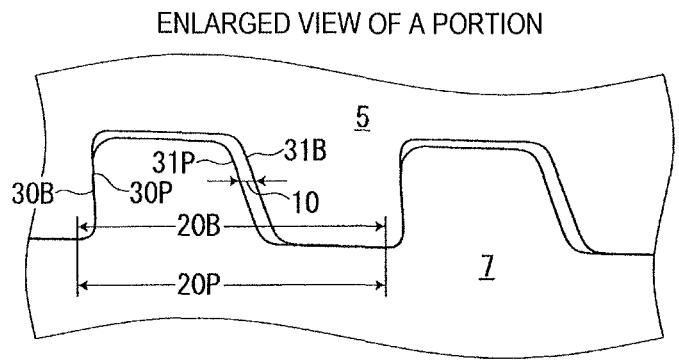

INTERNALLY-THREAD PITCH 20B = EXTERNALLY-THREAD PITCH 20P
THREAD GAP 10 BEING FIXED AT THIS POINT

FIG. 1C

ENLARGED VIEW OF B PORTION

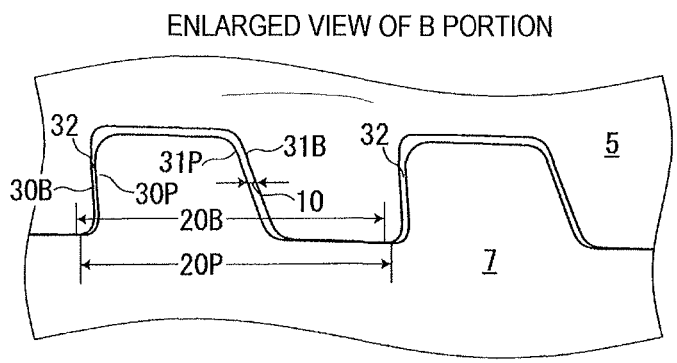

INTERNALLY-THREAD PITCH 20B < EXTERNALLY-THREAD PITCH 20P
THREAD GAP 10 IS GRADUALLY DECREASED AS POSITION OF A PORTION IN
THREADED PORTION APPROACHES BOX CENTER SIDE (PIN PIPE END SIDE)
THUS FORMING GAP 32 BETWEEN OPPOSEDLY-FACING LOAD FLANK FACES
30B AND 30P

A PORTION   B PORTION

ENLARGED VIEW OF A PORTION

ENLARGED VIEW OF B PORTION

THREADED JOINT FOR OIL COUNTRY TUBULAR GOODS

CROSS REFERENCE TO RELATED APPLICATIONS

This is the U. S. National Phase application of PCT/JP2014/003055, filed Jun. 9, 2014, which claims priority to Japanese Patent Application No. 2013-125332, filed Jun. 14, 2013, the disclosures of each of these applications being incorporated herein by reference in their entireties for all purposes.

TECHNICAL FIELD OF THE INVENTION

The present invention relates to a threaded joint for oil country tubular goods having excellent galling resistance, and more particularly to a threaded joint for oil country tubular goods having excellent galling resistance which is suitable for the connection of steel pipes such as an OCTG (oil country tubular goods) which include, in the same category, tubings or casings used for search and production of an oil well or a gas well in general, riser pipes or line pipes.

BACKGROUND OF THE INVENTION

A threaded joint has been popularly used for connecting steel pipes used in an oil-producing industrial facility such as oil country tubular goods. In connecting steel pipes used for search and production of oil or gas, conventionally, a standard threaded joint which is stipulated in API (American Petroleum Institute) has been typically used. However, recently, deepening of a well for crude oil or a natural gas has progressed and the number of horizontal wells and inclined wells instead of vertical wells has been increasing and hence, the drilling and production environment has become difficult. Further, the number of wells developed in an extremely challenging environment such as oceans and polar regions has been increasing and hence, the performances which threaded joints have to achieve are diversified including compression resistance, bending resistance, and sealability against external pressure (external pressure resistance). In view of the above, the number of cases where a special threaded joint having high performances which is referred to as "premium joint" is being used has increased, and a demand for the improvement of performances of the special threaded joint has been also increased more and more.

A premium joint is a coupling-type joint where externally-threaded members (hereinafter referred to as "pins") each of which includes a tapered thread, a seal portion (to be more specific, a metal to metal seal portion) and a shoulder portion (to be more specific, a torque shoulder portion) and is formed on a pipe end portion, and a internally-threaded member which includes tapered threads, seal portions (to be more specific, metal to metal seal portions) and shoulder portions (to be more specific, torque shoulder portions) and connects the pins to each other (hereinafter referred to as "box") are jointed to each other. The tapered threads are important for firmly fixing the pipe joint, the seal portions play a role of ensuring air tightness by bringing the box and the pins into metal contact at such portions, and the shoulder portions forma shoulder surfaces which play a role of stoppers during fastening of the joint.

FIG. 4 is schematic explanatory views showing a conventional example of a premium joint for an oil country tubular goods use. FIG. 4 is also longitudinal cross-sectional views of a threaded joint of a circular pipe (a cross-sectional view where a pipe axis extends in the cross section). The threaded joint includes pins 3 and a box 1 corresponding to the pins 3. On an outer surface thereof, the pin 3 has an externally-threaded portion 7 and a nose portion (also referred to as a pin nose) 8 which is an elongated portion formed adjacent to the externally-threaded portion 7 and has no threads on a distal side of the pin 3. The nose portion 8 has a seal portion (to be more specific, a metal to metal seal portion) 11 on an outer peripheral surface thereof, and a shoulder portion 12 on an end surface thereof. On an inner surface thereof, the box 1 corresponding to the pins 3 has internally-threaded portions 5, seal portions 13 and shoulder portions 14 which are portions being threadedly engaged with or brought into contact with the externally threaded portions 7, the seal portions 11 and the shoulder portions 12 of the pins 3 respectively.

With respect to respective thread ridges formed on the pins 3 and respective thread roots formed on the box 1 corresponding to the thread ridges formed on the pins 3, a face on an opposite side to a pin pipe end (box end side) is referred to as a load flank face 30 (P being affixed to the load flank face 30 on a pin side and B being affixed to the load flank face 30 on a box side), and a face on a pin pipe end side (a box center side) is referred to as a stabbing flank face 31 (P being affixed to the stabbing flank face 31 on a pin side and B being affixed to the stabbing flank face 31 on a box side).

In the conventional example shown in FIG. 4, the seal portion 11 is formed on a distal portion of the pin 3, and desired seal performance can be realized by imparting an appropriate fastening torque. However, the fastening torque is influenced by a lubrication condition, a surface property and the like. As a design of a threaded joint which does not largely depend on these factors, there has been known a radial-directional seal method (also referred to as a radial seal type) where a radial directional component of a seal contact pressure is relatively increased.

With respect to the point where the seal portion is provided at a portion different from the shoulder portion, the radial-seal-type threaded joint is substantially equal to the conventional threaded joint having the seal portion on the distal portion of the pin.

The threaded portions of the threaded joint are not uniformly threadedly engaged with each other so that a concentrated load is generated at a thread end portion in general, and galling occurs when the concentrated load is excessively large.

As a prior art relating to this point, in patent literature 1, there is the description where a concentrated load is generated on stabbing flank faces of both end portions of a screw, and a countermeasure to cope with galling at the end portions of the box is particularly important. Accordingly, in the above-mentioned prior art, a concentrated load is decreased in such a manner that the stabbing flank faces 31 are formed by cutting with a pitch slightly increased only in a last pass or in several last passes in thread forming while keeping a pitch of load flank faces 30 at a fixed value so that a gap is formed between both stabbing flank faces 31B and 31P.

CITATION LIST

Patent Literature

PTL 1: JP-A-2001-21072

SUMMARY OF THE INVENTION

However, in the threaded joint having the shoulder portions 12 and 14, when the shoulder portions 12 and 14 which form shoulder faces playing a role of stopper are brought into contact with each other during the fastening operation, a contact reaction force in the axial direction (meaning the pipe axis direction) acts on the load flank face 30P of the threaded portion on a pin pipe end side and hence, a largest axial reaction force is generated on the load flank face 30P of the threaded portion on the pin pipe end side. However, in the above-mentioned prior art, only the case where the contact is made on the stabbing flank face 31B is estimated and hence, the prior art has a drawback that when a highly concentrated load acts on the load flank face 302 of the threaded portion on the pin pipe end side, the concentrated load cannot be decreased.

The inventors of the present invention have made various studies to overcome the above-mentioned drawback, have found that a contact reaction force with a threaded portion on a pin pipe end side can be decreased by properly setting a thread pitch on a box center side so that galling can be prevented, and have arrived at the present invention based on such finding.

Aspects of the present invention have the following technical features.

(1) A threaded joint for oil country tubular goods having excellent galling resistance which includes:

pins each of which occupies a pipe end portion of a steel pipe for an oil country tubular goods, and includes a externally-threaded portion, a nose portion which extends toward a pipe end side from the externally-threaded portion, and a shoulder portion forming a distal end of the nose portion; and a box which includes internally-threaded portions each forming a threaded portion by being threadedly joined with the externally-threaded portion, and shoulder portions which are brought into contact with the shoulder portions of the pins, the pins and the box being joined to each other by the threaded joining so that portions between the threaded portions and the shoulder portions are brought into metal-to-metal contact with each other thus forming seal portions at the contact portions, and the shoulder portions of the pins and the shoulder portions of the box forming shoulder faces which are brought into contact with each other at the time of fastening the threaded joint, wherein a pitch change is made such that a internally-thread pitch has the same value as a externally-thread pitch from a thread end portion on a box end side to a pitch change position taken on a box center side with respect to a position away from the thread end portion by ½ of an entire length of the threaded portion, and the internally-thread pitch is changed to a value less than the externally-thread pitch at the pitch change position so that a thread gap is gradually decreased from the pitch change position to a position of the thread end portion on the box center side, and the thread gap is eventually set to a value which is 0.2 to 0.8 times as large as the thread gap before the pitch change is made, where the definition of the thread gap is as follows:

The thread gap is a distance in a pipe axis direction between stabbing flank faces which face each other within a complete fitting range of the threaded portions of the pin and the box in a state where load flank faces which face each other on a box end side contact with each other with no gap therebetween within the complete fitting range of the threaded portions of the pin and the box.

According to aspects of the present invention, by adopting the above-mentioned constitution, a concentrated load on the threaded portion on the pin pipe end side can be decreased so that the threaded joint for oil country tubular goods having excellent galling resistance can be acquired.

BRIEF DESCRIPTION OF THE DRAWINGS

FIGS. 1A-1C are schematic explanatory views exemplifying an embodiment of the present invention.

DETAILED DESCRIPTION OF EMBODIMENTS OF THE INVENTION

Figure 4A:
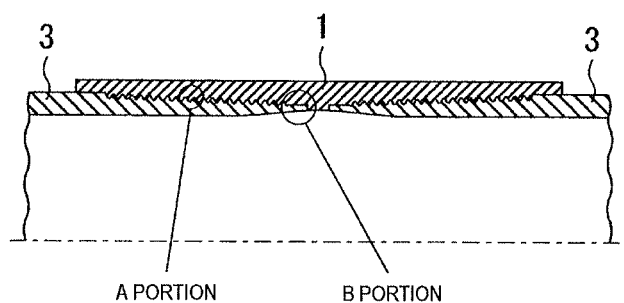
FIGS. 4A-4C are schematic explanatory views exemplifying a conventional special threaded joint.
Figure 4B:
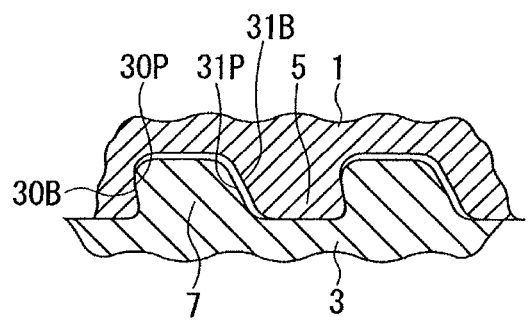
Figure 4C:
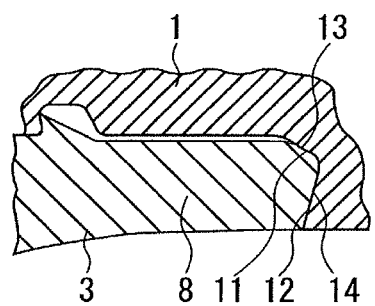

An embodiment of the present invention is explained by reference to FIG. 1. The threaded joint according to aspects of the present invention has the substantially same constitution as the conventional premium joint exemplified in FIG. 4 with respect to the point that the threaded joint includes: pins 3 each of which occupies a pipe end portion of a steel pipe 2 for an oil country tubular goods, and includes a externally-threaded portion 7, a nose portion 8 which extends toward a pipe end side from the externally-threaded portion 7, and a shoulder portion 12 forming a distal end of the nose portion 8; and a box 1 which includes internally-threaded portions 5 each forming a threaded portion by being threadedly joined with the externally-threaded portion 7, and shoulder portions 14 which are brought into contact with the shoulder portions 12 of the pins 3, wherein the pins 3 and the box 1 are joined to each other by the threaded joining so that portions between the threaded portions 5 and 7 and the shoulder portions 12 and 14 are brought into metal-to-metal contact with each other thus forming seal portions 11 and 13 at the contact portions, and the shoulder portions 12 of the pins 3 and shoulder portions 14 of the box 1 form shoulder faces which are brought into contact with each other at the time of fastening the threaded joint (see FIG. 1(a)).

The technical feature of aspects of the present invention lies in that, in the internally-threaded portion 5, a pitch change is made such that a internally-thread pitch 20B has the same value as an externally-thread pitch 20P from a thread end portion on a box end side to a pitch change position PCP taken on a box center side with respect to a position away from the thread end portion by ½ of an entire length of the threaded portion (see FIG. 1(b)), and the internally-thread pitch 20B is changed to a value less than the externally-thread pitch 20P at the pitch change position PCP so that a thread gap 10 defined above is gradually decreased from the pitch change position PCP to a position of the thread end portion on the box center side (see FIG. 1(c)), and the thread gap is eventually set to a value which is 0.2 to 0.8 times as large as the thread gap before the pitch change is made.

By performing the above-mentioned pitch change, as shown in FIG. 1(c), after the pitch change is made (on a pin pipe end side with respect to the pitch change position PCP), the load flank face 30B gradually shifts toward a box end side as the position of a portion in the threaded portion approaches close to the pin pipe end and, as the result, the thread gap 10 is gradually decreased. Along with the decrease of the thread gap 10, a gap 32 is formed between the load flank faces 30P and 30B which face each other. The closer the position of a portion in the threaded portion approaches to the pin pipe end, the larger the gap 32 becomes and hence, there arises an effect that a contact face pressure which acts on the load flank face 30P on a pin pipe end side is decreased (a face pressure decreasing effect). Accordingly, a concentrated load which acts on the load flank face 30P on a pin pipe end side at the time of fastening is dispersed so that it is possible to acquire an effect of effectively decreasing the load (referred to as a load dispersing effect).

When a final value of the gradually decreased thread gap 10 exceeds 0.8 times of the value of the thread gap 10 before the pitch change is made (in the region on the box end side with respect to the pitch change position PCP), the above-mentioned face pressure decreasing effect becomes insufficient. On the other hand, when the final value is less than 0.2 times of the value of the thread gap 10 before the pitch change is made, there is a possibility of the occurrence of galling due to the interference between stabbing flank faces 31P and 31B on a pin pipe end side. Accordingly, it is necessary to set the final value of the gradually decreased thread gap 10 to 0.2 to 0.8 times of the value of the thread gap 10 before the pitch change is made.

When a length of a region in the pipe axis direction from the pitch change position PCP to an end of the internally-threaded portion 5 on a box center side (referred to as a short-pitched region) is set excessively long, there arises a difficulty that an extremely accurate pitch change becomes necessary so that the threaded joint is not suitable for industrial production. There also arises a difficulty that when the short-pitched region includes a wide region where no concentrated load exists although a contact face pressure is increased only in the vicinity of a pin pipe end side, the above-mentioned load dispersing effect becomes insufficient. In view of the above, it is necessary to set the length of the short-pitched region to less than ½ of the entire length of the threaded portion.

When the length of the short-pitched region is excessively short, there is a possibility that a load diffusion effect becomes insufficient so that a concentrated load is generated in the threaded portion outside the short-pitched region. Accordingly, it is preferable to set the length of the short-pitched region to a length corresponding to an amount of three ridges in terms of the number of thread ridges (an amount of three pitches in terms of the thread pitch) or more.

Figure 2A:
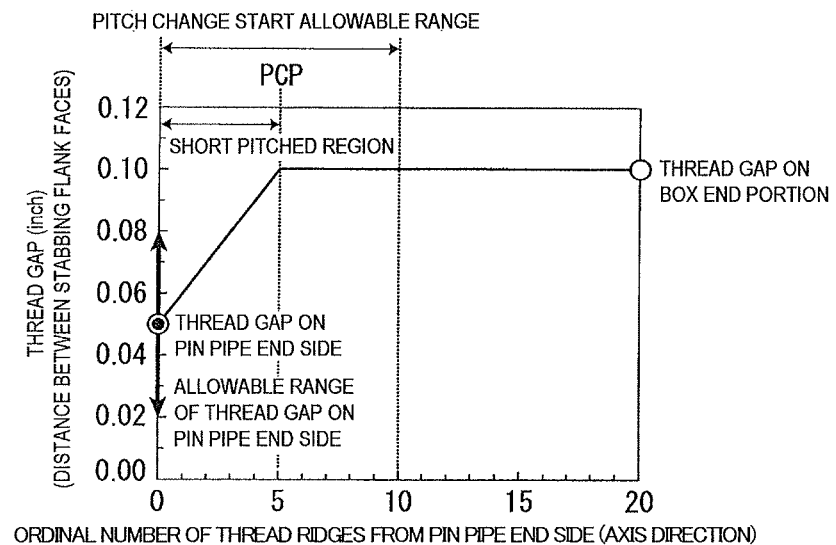
FIG. 2A is a graph exemplifying the thread gap distribution in a pipe axis direction in accordance with aspects of the present invention.
Figure 2B:
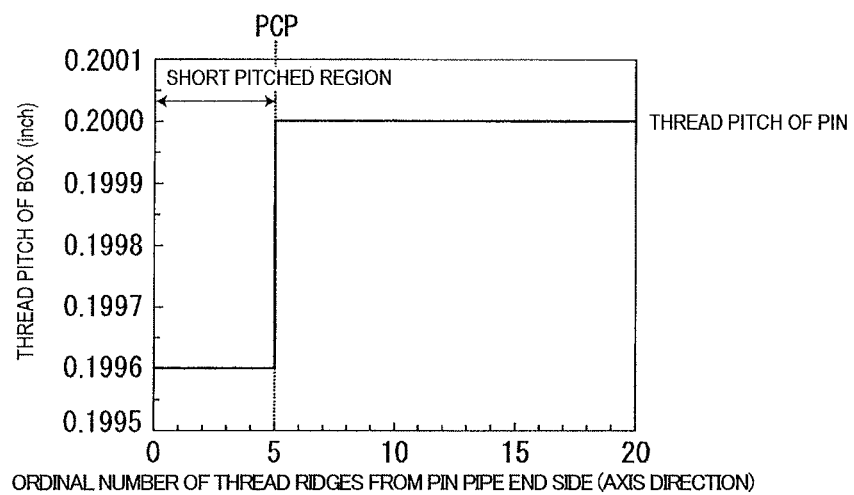
FIG. 2B is a graph exemplifying the thread pitch distribution in a pipe axis direction in accordance with aspects of the present invention.

FIG. 2 is graphs showing one example of the pitch change according to aspects of the present invention, wherein FIG. 2(a) is a diagram setting the relationship between the number of thread ridges which are used as indices of the distance in the pipe axis direction from a pin pipe end side and the thread gap. FIG. 2(b) is a diagram setting the relationship between the number of thread ridges and the pitch of internally-threads. In this embodiment, a threaded joint which is constituted of: pins formed by applying thread cutting to end portions of a steel pipe having an outer diameter of 7⅝"(inch) and a wall thickness of 0.625" (inch); and a box corresponding to the pins is used as a subject. The pitch change position PCP is set at the position where the number of thread ridges is 5, and the internal pitch is changed from 0.2000" (inch) to 0.1996" (inch) at this position. The number of thread ridges over the entire length of the threaded portion is larger than 20.

Figure 3:
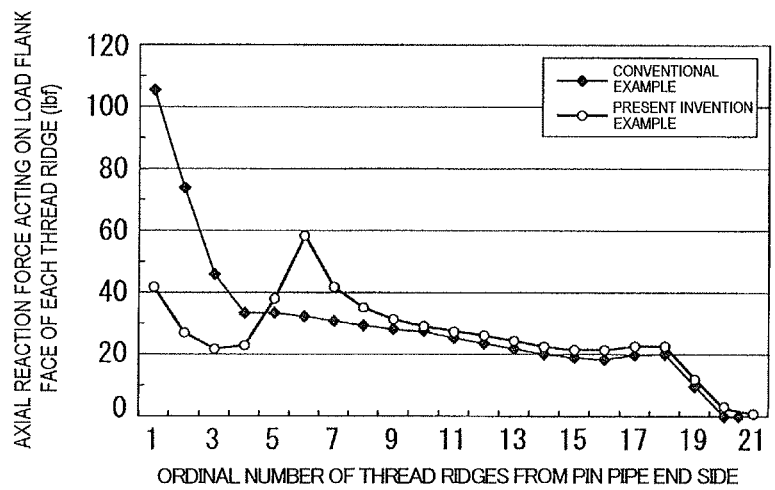
FIG. 3 is a graph exemplifying an axial reaction force which acts on load flank faces of respective threads of an externally-threaded portion at the time of fastening the threaded joint.

With respect to the threaded joint of this embodiment (present invention example), a pipe axis reaction force (concentrated load) which acts on a load flank face of each thread ridge portion is calculated by an FEM (finite element method). To compare the pipe axis reaction force with a pipe axis reaction force when the pitch change is not performed (conventional example), as shown in FIG. 3, it is understood that a concentrated load of the present invention example is lower than the concentrated load of the conventional example, and the maximum value is halved.

Examples of the Invention

With respect to a threaded joint for an oil country tubular goods which includes: pins formed by applying thread cutting to pipe end portions of a steel pipe having an outer diameter of 9⅝" (inch) and a wall thickness of 0.545" (inch); and a box corresponding to the pins, and has levels of data on sizes of threaded portions shown in Table 1, a Make & Break test in which fastening and releasing after fastening are repeatedly performed is carried out in accordance with ISO 13679:2002. The test conditions are set such that a thread interference amount is "High" (0.305 mm), a seal interference amount is "High" (1.016 mm) and a fastening torque is "High" (50,000 N·m). Here, the seal interference amount is a value which is twice as large as a largest value of a size in the pipe radial direction (a value per diameter) of a region where a portion which becomes a pin-side seal portion and a portion which becomes a box-side seal portion interfere with each other when a pin drawing and a box drawing are overlapped to each other such that their pipe axes and their shoulder portions agree with each other. The thread interference amount is a value which is twice as large as a size in the pipe radial direction (a value per diameter) of a region where a portion which becomes a pin-side threaded portion and a portion which becomes a box-side threaded portion interfere with each other in such a case.

The result of the test is shown in Table 1. As shown in Table 1, galling is not generated at any levels with respect to the present invention examples so that the present invention examples have passed the Make & Break test.

TABLE 1

| Level No. | Outside short-pitched region | | Entire length of threaded portion [inch] | Within short-pitched region | | | | Make & Break test result | Remarks |
|---|---|---|---|---|---|---|---|---|---|
| | Thread pitch [inch] | Thread gap G0 [inch] | | Thread pitch [inch] | Region length [inch] | Thread gap | | | |
| | | | | | | Final value G1 [inch] | Ratio G1/G0 [—] | | |
| 1 | 0.2000 | 0.0040 | 4.500 | 0.1996 | 0.998 | 0.0020 | 0.50 | Passed test through 4 passes without galling | Present invention example |
| 2 | 0.2000 | 0.0040 | 4.500 | 0.1997 | 1.997 | 0.0030 | 0.75 | Passed test through 4 passes without galling | Present invention example |

TABLE 1-continued

| | Outside short-pitched region | | Entire length of threaded portion [inch] | Within short-pitched region | | | | | |
|---|---|---|---|---|---|---|---|---|---|
| | | | | | | Thread gap | | | |
| Level No. | Thread pitch [inch] | Thread gap G0 [inch] | | Thread pitch [inch] | Region length [inch] | Final value G1 [inch] | Ratio G1/G0 [—] | Make & Break test result | Remarks |
| 3 | 0.2000 | 0.0040 | 4.500 | 0.1997 | 0.599 | 0.0009 | 0.23 | Passed test through 4 passes without galling | Present invention example |
| 4 | 0.2000 | 0.0040 | 4.500 | 0.1993 | 0.797 | 0.0028 | 0.70 | Passed test through 4 passes without galling | Present invention example |
| 5 | 0.2000 | 0.0040 | 4.500 | — | — | 0.0040 | 1.00 | Galling occurred in the 2nd pass | Comparative example |
| 6 | 0.2000 | 0.0040 | 4.500 | 0.1991 | 0.796 | 0.0036 | 0.90 | Galling occurred in the 3rd pass | Comparative example |
| 7 | 0.2000 | 0.0040 | 4.500 | 0.1997 | 2.396 | 0.0004 | 0.10 | Galling occurred in the 3rd pass | Comparative example |

REFERENCE SIGNS LIST

1: box
2: oil country tubular goods
3: pin
5: internally-threaded portion (box side)
7: externally-threaded portion (pin side)
8: nose portion (pin nose)
10: thread gap
11, 13: seal portion (metal to metal seal portion)
12: shoulder portion (pin side)
14: shoulder portion (box side)
20: thread pitch (auxiliary sign P means pin side, B means box side)
30: load flank face (auxiliary sign P means pin side, B means box side)
31: stabbing flank face (auxiliary sign P means pin side, B means box side)
32: gap (gap between load flank faces which face each other)
PCP: pitch change position

The invention claimed is:

1. A threaded joint comprising:
pins, each of which occupies a pipe end portion of a steel pipe, and includes an externally-threaded portion, a nose portion which extends toward a pipe end side from the externally-threaded portion, and a shoulder portion forming a distal end of the nose portion; and
a box which includes internally-threaded portions each forming a threaded portion by being threadedly joined with the externally-threaded portion, and shoulder portions which are brought into contact with the shoulder portions of the pins, the pins and the box being joined to each other by the threaded joining so that portions between the threaded portions and the shoulder portions are brought into metal-to-metal contact with each other thus forming seal portions brought into metal-to-metal contact, and
the shoulder portions of the pins and the shoulder portions of the box forming shoulder faces which are brought into contact with each other at the time of fastening the threaded joint, wherein
a pitch change is made such that an internally-thread pitch has the same value as a externally-thread pitch from a thread end portion on a box end side to a pitch change position taken on a box center side which is on the pipe end side with respect to a position away from the thread end portion by half of an entire length of the threaded portion, and the internally-thread pitch is changed to a value less than the externally-thread pitch at the pitch change position so that a thread gap is gradually decreased from the pitch change position to a position of the thread end portion on the box center side, and the thread gap is eventually set to a value which is 0.2 to 0.8 times as large as the thread gap before the pitch change is made,
where the thread gap is a distance in a pipe axis direction between stabbing flank faces which face each other within a complete fitting range of the threaded portions of the pin and the box in a state where load flank faces which face each other on a box end side contact with each other with no gap therebetween within the complete fitting range of the threaded portions of the pin and the box.

* * * * *